(12) United States Patent
Jorro de Inza et al.

(10) Patent No.: US 9,944,227 B2
(45) Date of Patent: Apr. 17, 2018

(54) ILLUMINATED INNER TRIM FOR VEHICLES

(71) Applicant: GRUPO ANTOLÍN-INGENIERÍA, S.A., Burgos (ES)

(72) Inventors: Alejandro Jorro de Inza, Burgos (ES); Fernando Juez González, Burgos (ES); Marta María Castillo García, Burgos (ES); Jesús Vicente Escudero Delgado, Burgos (ES)

(73) Assignee: GRUPO ANTOLÍN-INGENIERÍA, S.A., Burgos (ES)

(*) Notice: Subject to any disclaimer, the term of this patent is extended or adjusted under 35 U.S.C. 154(b) by 149 days.

(21) Appl. No.: 15/159,597

(22) Filed: May 19, 2016

(65) Prior Publication Data

US 2016/0356449 A1 Dec. 8, 2016

(30) Foreign Application Priority Data

Jun. 5, 2015 (EP) .................................. 15382295

(51) Int. Cl.
*B60Q 3/54* (2017.01)
*B60Q 3/74* (2017.01)
*F21Y 101/00* (2016.01)

(52) U.S. Cl.
CPC .............. *B60Q 3/54* (2017.02); *B60Q 3/745* (2017.02); *D10B 2403/02431* (2013.01); *F21Y 2101/00* (2013.01)

(58) Field of Classification Search
CPC . B60Q 3/54; B60Q 3/745; D10B 2403/02431
See application file for complete search history.

(56) References Cited

U.S. PATENT DOCUMENTS

| | | | | |
|---|---|---|---|---|
| 8,353,602 | B2* | 1/2013 | Van Herpen | B60Q 1/52 362/153 |
| 8,754,426 | B2* | 6/2014 | Marx | F21K 9/00 257/88 |
| 8,888,334 | B2* | 11/2014 | Hansch | D03D 9/00 362/217.02 |
| 2012/0127704 | A1 | 5/2012 | Hansch | |

FOREIGN PATENT DOCUMENTS

| | | | | |
|---|---|---|---|---|
| CA | 2897057 A1 * | 1/2016 | | B64D 11/00 |
| DE | 102013004002 A1 | 9/2014 | | |
| WO | 2014029802 A1 | 2/2014 | | |

OTHER PUBLICATIONS

Extended European Search Report—EP 15382295.2—dated Feb. 9, 2016.

* cited by examiner

*Primary Examiner* — Robert May
(74) *Attorney, Agent, or Firm* — Banner & Witcoff, Ltd.

(57) ABSTRACT

Illuminated inner trim for vehicles comprising a substrate, a decorative lining, and integrated between these a set of LEDs that can provide a decorative illumination such that when on they are visible through the decorative lining as well-defined points of light, while when off they are unseen. Specifically, when said LEDs are on and the vehicle occupants change their angle of vision with respect to the LEDs, a set of points of light will be seen with variable intensity due to the contrast between areas of direct light and areas of shade, causing a sparkling effect.

3 Claims, 3 Drawing Sheets

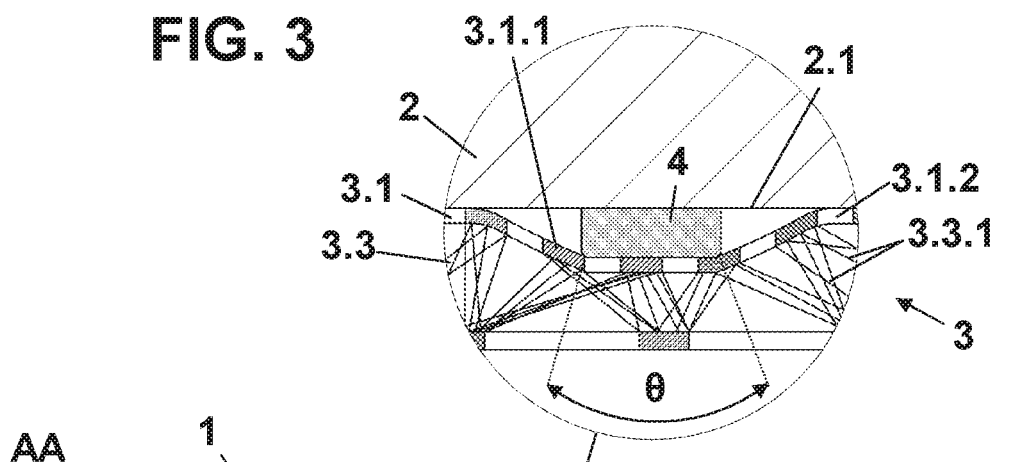
FIG. 3
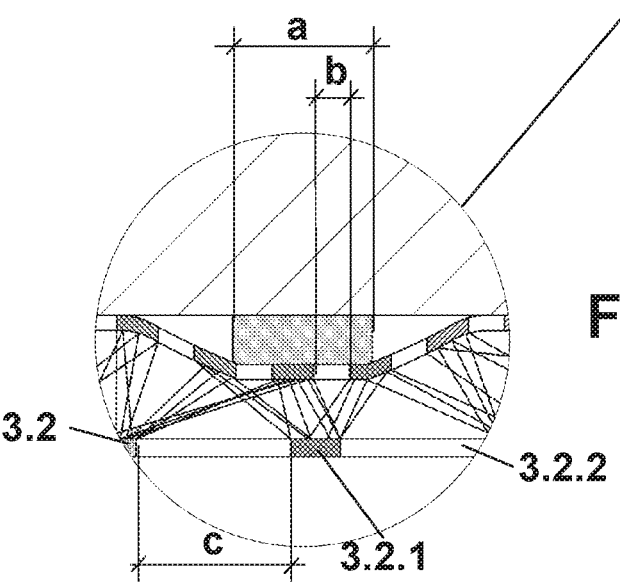
FIG. 4
FIG. 2

ILLUMINATED INNER TRIM FOR VEHICLES

CROSS-REFERENCE TO RELATED APPLICATIONS

The present application claims priority to Application EP 15382295.2, filed Jun. 5, 2015. Benefit of the filing date of this prior application is hereby claimed. The prior application is hereby incorporated by reference in its entirety.

TECHNICAL FIELD OF THE INVENTION

The present invention relates to an illuminated inner trim for vehicles comprising a substrate, a decorative lining, and integrated between these a set of LEDs that can provide a decorative illumination such that when on they are visible through the decorative lining as well-defined points of light, while when off they are unseen.

In addition, when the vehicle occupants change their angle of vision with respect to the points of light, a set of points of light will be seen with variable intensity due to the contrast between regions of direct light and regions of shade, causing a sparkling effect.

BACKGROUND OF THE INVENTION

Inner trims for vehicles are known that integrate lighting devices which comprise a set of LED point light sources, such that said LEDs are concealed between the layers of the inner trim.

The light emitted by the LEDs is transmitted to the inside of the vehicle either through openings made in the decorative lining or through the decorative lining itself with the use of translucent decorative linings. Thus, in this case the decorative lining allows transmitting the light while at the same time concealing the lighting device. One example that describes this solution is patent WO2014029802.

However, in this case the fact that the light must cross the decorative lining causes a diffusion effect that generates undesired halos, loss of definition of the points of light, loss of intensity, and consequently is detrimental to the quality of the decorative illumination obtained.

In view of the above, the subject matter of the invention relates to an inner trim with decorative illumination in the form of well-defined points of light, generated by point light sources integrated between the substrate and the decorative lining, such that said decorative lining conceals the light sources when they are off, and such that it allows an illumination of variable intensity depending on the angle of vision of the occupant with respect to the points of light, such as to obtain a sparkling effect.

DESCRIPTION OF THE INVENTION

The present invention is established and characterised in the independent claims, while the dependent claims describe additional characteristics thereof.

Firstly the configuration of the invention allows obtaining well-defined points of light.

Due to the contact between the LEDs and the decorative lining, the diffusion effect of the light responsible for halo generation is reduced, and consequently also the loss of intensity of said light, allowing to maintain a high definition of the light emitted by the LED received by the decorative lining, thereby contributing to obtaining well-defined points of light.

Since the first layer comprises opaque threads knitted to one another to form orifices with a maximum size smaller than the minimum size of the light emitting surface of the LED that is in contact with said layer, profiled illuminated surfaces without halos are generated that contribute to obtaining well-defined points of light.

Secondly, due to the interposition of opaque threads between the first and second layers of the decorative lining through which the light is transmitted to the vehicle interior, areas with direct light emission and areas in shade are defined.

Said opaque threads block the direct light emitted by the aforementioned light point through the decorative lining, particularly through the intermediate layer that forms part thereof, creating said areas in shade between the areas of emission of direct light.

Thus, when the direct light emitted by one of the points of light is observed along a specific angle of vision, the direct light is seen completely, while the intensity of the light seen falls when said angle of vision is changed as the threads of the intermediate layer will be interposed between the occupant and said point of light.

Thus, when the occupants change their angle of vision with respect to the point of light, a set of points of light will be seen with variable intensity due to the contrast between areas of direct light and areas of shade, causing a sparkling effect.

Consequently, the combination of features of the inner trim of the invention described above, that is, the combination of features allowing well-defined points of light to be obtained and features allowing the creation of areas of shade and areas of direct light emission allows obtaining the sparking effect object of the invention when the occupants change their angle of vision with respect to the point of light.

DESCRIPTION OF THE DRAWINGS

This specification is supplemented with a set of drawings illustrating the preferred embodiment, which are never intended to limit the invention.

FIG. 2 shows a cross-sectional view along the line AA represented in FIG. 1, corresponding to a cross section of the inner trim.

FIG. 3 shows a detail of FIG. 2 revealing the structure of the decorative lining and the arrangement of a LED with respect to the same.

FIG. 4 shows a detail of FIG. 2 showing the dimensions of the orifices of the decorative lining and the LED.

DETAILED DESCRIPTION

Figure 1:
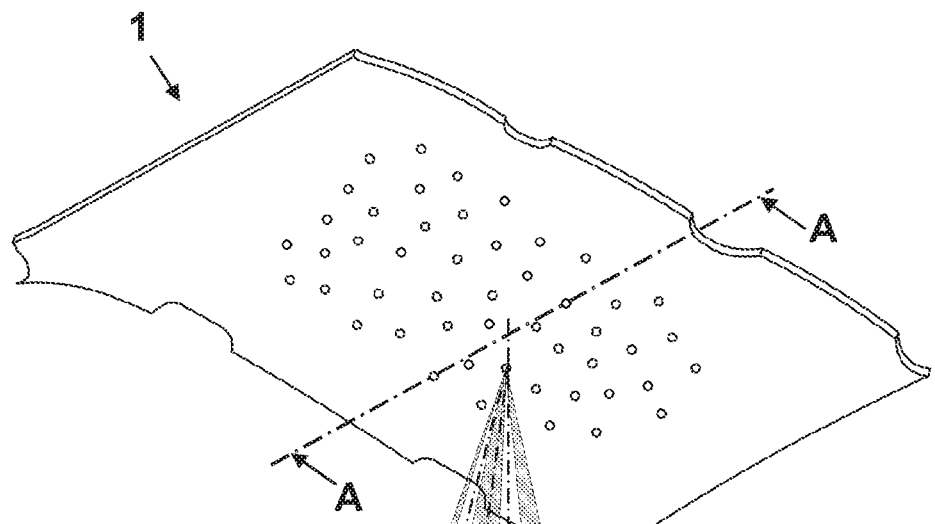
FIG. 1 shows a perspective view of an inner trim in an on state, also showing the various areas of shade and direct light emission from a point of light.

FIG. 1 shows an illuminated inner trim (1) for vehicles in an on state, where there is a set of well-defined points of light.

Specifically, FIG. 1 shows a headliner by way of example; however, the inner trim (1) of the invention could be any other type of inner vehicle trim, such as a door panel, a side trim element, a dashboard, a trunk lining or a sun visor.

FIG. 2 shows the structural configuration of the illuminated inner trim (1) and specifically the integrated arrangement of the set of LEDs (4) between the substrate (2) and the decorative lining (3) that form said inner trim (1).

Specifically, the inner trim (1), as shown in FIGS. 2, 3 and 4 comprises:
- a substrate (2) that include the rigid part of the inner trim (1) with a primarily structural function, that is, supporting the loads typical of an inner trim (1) first during handling and then during the lifetime thereof when assembled on the vehicle,
- a translucent decorative lining (3) that covers one of the faces of the substrate (2) comprising:
  - a first layer (3.1) of knit fabric located nearest the substrate (2),
  - a second layer (3.2) of knit fabric located farther away from the substrate (2), and
  - an intermediate layer (3.3) formed by threads (3.3.1) that connect said first layer (3.1) and second layer (3.2),
- wherein said first layer (3.1), second layer (3.2) and intermediate layer (3.3) form a single three-dimensional knit fabric,
- a set of LEDs (4) placed between the substrate (2) and the decorative lining (3), wherein said LEDs (4) have a dimension "a" corresponding to the minimum width of the light emission surface of the LED (4),
- wherein the first layer (3.1) includes opaque threads (3.3.1) knitted to one another to form orifices (3.1.2) with a maximum dimension "b" that is smaller than the dimension "a",
- wherein the threads (3.3.1) that form the intermediate layer (3.3) are opaque,
- and wherein the LEDS (4) are in contact with the first layer (3.1).

The described configuration allows, when the LEDs (4) are on, generating well-defined light points (7).

Said light points (7) comprise a portion of the light emission surface of the LEDs (4) that is delimited by the opaque threads (3.3.1) knitted to each other to form the orifices (3.1.2) of the first layer (3.1) of the decorative lining (3), such that the rest of the light-emitting surface of the LEDs (4) is covered.

Figure 5:
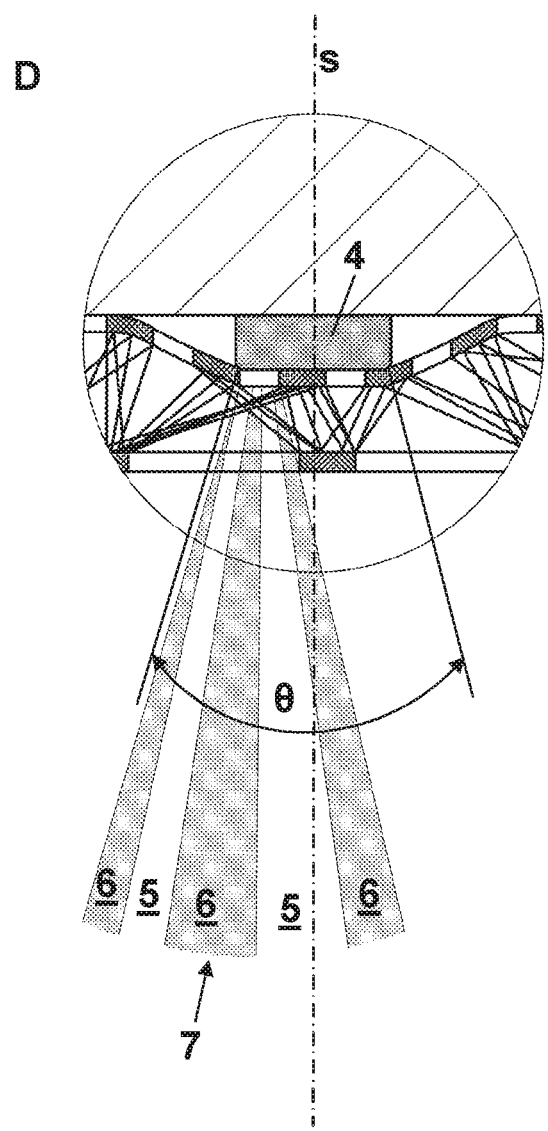
FIG. 5 shows a detail D of FIG. 2 showing the various areas of shade and direct light emission from a point of light.

As shown in FIG. 1, depending on the position of an occupant M with respect to the light point (7), the occupant's view will be from a first position M1 with an angle α of vision of the light point (7) with respect to the main axis "s" of the LED (4), an area of direct light emission (5) formed by the light emitted directly by the light points (7) and transmitted through the second layer (3.2), or from a position M2 with an angle β of vision of the light point (7) with respect to the main axis "s" of the LED (4), an area of shade (6) formed by the light emitted by the light points (7) and obstructed by the strands (3.3.1) that form the intermediate layer (3.3), as shown in the detail D of FIG. 5.

Thus, when the occupants change their angle of vision with respect to the point of light, a set of points of light will be seen with variable intensity due to the contrast between areas of direct light and areas of shade, causing a sparkling effect.

Therefore, the movement of the occupant M with respect to the light point (7) results in the sparkling effect perceived as a set of light points (7) with variable intensity due to the contrast between the areas of direct light (5) and areas of shade (6).

In a specific case, the second layer (3.2) includes threads (3.2.1) knitted to one another to form orifices (3.2.2) with a minimum dimension "c" that is larger than the dimension "a". This allows increasing the sparkling effect caused by the combination of areas of direct light (5) and areas of shade (6) due to the presence of opaque threads (3.3.1) in the intermediate layer (3.3), as the occupant M can see a greater number of areas of direct light emission (5) and areas of shade (6) through the orifice (3.2.1) of the second layer (3.2).

In a specific case and in order to define further the light point, the LEDs (4) used have an emission angle θ under 145°, allowing to concentrate the light emitted by said LEDs (4) thereby contributing to improving the definition of the light point (7), enhancing the contrast between the areas of direct light and the areas of shade and consequently the sparkling effect perceived.

In a specific case, the LEDs (4) are of the SMD (surface mounted device) type, due to the small size thereof, allowing the improvement of their integration between the substrate and the decorative lining, concealing their presence when said LEDs (4) are off.

The invention claimed is:

1. Illuminated inner trim for vehicles comprising:
   a substrate (2);
   a decorative lining (3) that covers one of the faces (2.1) of the substrate (2) comprising:
     a first layer (3.1) of knit fabric located nearest the substrate (2);
     a second layer (3.2) of knit fabric located farther away from the substrate (2); and
     an intermediate layer (3.3) formed by threads (3.3.1) that connect said first layer (3.1) and second layer (3.2);
   wherein said first layer (3.1), second layer (3.2) and intermediate layer (3.3) form a single three-dimensional knit fabric;
   a set of LEDs (4) placed between the substrate (2) and the decorative lining (3), wherein said LEDs (4) have a dimension "a" corresponding to the minimum width of the light emission surface of the LED (4);
   wherein the first layer (3.1) includes opaque threads (3.1.1) knitted to one another to form orifices (3.1.2) with a maximum dimension "b" that is smaller than the dimension "a";
   wherein the threads (3.3.1) that form the intermediate layer (3.3) are opaque;
   and wherein the LEDs (4) are in contact with the first layer (3.1).

2. Illuminated inner trim for vehicles according to claim 1, wherein the LEDS (4) have an emission angle θ under 145°.

3. Illuminated inner trim for vehicles according to claim 1, wherein the second layer (3.2) includes threads (3.2.1) knitted to one another to form orifices (3.2.2) with a minimum dimension "c" that is larger than the dimension "a".

* * * * *